United States Patent [19]

Okano et al.

[11] 3,878,475

[45] Apr. 15, 1975

[54] SYSTEM FOR REPRODUCING CARRIER WAVE FOR N DIFFERENTIAL PHASE SHIFT KEYED MODULATED WAVE

[75] Inventors: Akira Okano; Yoichi Moritani; Masahiro Murakami, all of Amagasaki, Japan

[73] Assignee: Mitsubishi Denki Kabushiki Kaisha, Tokyo, Japan

[22] Filed: Dec. 28, 1973

[21] Appl. No.: 429,294

[30] Foreign Application Priority Data

Dec. 28, 1972 Japan .................................. 48-1475

[52] U.S. Cl. .................................... 331/12; 329/112

[51] Int. Cl. ............................................... H03b 3/06

[58] Field of Search .......... 331/12; 329/112; 332/19

[56] References Cited

UNITED STATES PATENTS

| | | | |
|---|---|---|---|
| 3,358,240 | 12/1967 | McKay | 331/12 |
| 3,555,194 | 1/1971 | Goto | 331/12 |
| 3,815,034 | 6/1974 | Kato | 329/112 |

*Primary Examiner*—John Kominski

*Attorney, Agent, or Firm*—Wenderoth, Lind & Ponack

[57] ABSTRACT

A 4 differential phase shift keyed modulated signal is splitted into four signal portions having incremenal phase shifts of $\pi/2$. The signal portions are phase detected with a reproduced carrier wave respectively. When each of the detected signal portions is under a predetermined threshold level as determined by an individual level discriminator that detected signal portion $\pi/2$ lagging or leading phase with respect to the same is passed through the associated gate circuit to a composition circuit. The circuit composes the signal portions into a sawtoothed waveform. The waveform is supplied to a voltage controlled oscillator where the carrier wave is reproduced.

6 Claims, 9 Drawing Figures

SYSTEM FOR REPRODUCING CARRIER WAVE FOR N DIFFERENTIAL PHASE SHIFT KEYED MODULATED WAVE

BACKGROUND OF THE INVENTION

This invention relates to a system for reproducing a carrier wave for $n$ differential phase shift keyed modulated wave where $n$ is an integer of two or more and more particularly to such a system having a wide area in which the phase can be locked.

There have been already proposed data transmission systems employing the carrier wave having its phase varied in accordance with data to be transmitted. Such a system is called a phase modulation system in which a phase of a carrier wave is changed in accordance with data to be transmitted in any of $n$ preset phases set in order to transmit the data where $n$ is an integer having a value of two or more. The carrier wave thus phase modulated is called $n$ differential phase shift keyed (which is abridged hereinafter to "n PSK" modulated wave. For example, 4 PSK modulated wave for $n=4$ has four phases of 0, $\pi/2$, $\pi$, and $3\pi/2$ radians and a carrier wave therefor may be, for example, arranged such that those portions with the zero, $\pi/2$, $\pi$ and $3\pi/2$ phase serve to transmit digital data "00," "01," "10" and "11" respectively. It will readily understood that the number of the phase may be selected to be any integer equal to or greater than two and that the more the phase number the more the quantity of data to be transmitted will be. In that event, the receiving side is required to demodulate the $n$ PSK modulated wave transmitted thereto. To this end, it is necessary to reproduce a carrier wave on the basis of the transmitted $n$ PSK modulated wave.

In the past, this reproduction of the carrier wave has been accomplished by phase detecting the $n$ PSK modulated wave $n$ phase detectors formed so as to have the axes of phase detection disposed at equal angular intervals of $2\pi/n$ radian and composing detected outputs from the phase detectors together to form a phase locked loop. The measure has given a phase locking area extending through angle of $\pi/n$. The wider this locking area is wider the more the phase will be favorably locked. Therefore it is desirable to broaden the locking area. For this purpose, a so-called inverse modulation system has been proposed but it is very complicated in the hardwave or circuit configuration.

SUMMARY OF THE INVENTION

Accordingly, it is an object of the present invention to provide a new and improved system for reproducing a carrier wave for an $n$ PSK modulated wave with a simple circuit configuration having a phase locking area wider than that previously obtained.

The present invention accomplishes this object by the provision of a system for reproducing a carrier wave for an $n$ PSK modulated wave where $n$ is an integer having a value of at least two, comprising, in combination, $n$ phase detectors for phase detecting the $n$ PSK modulated wave, an $(m+1)$th one of the phase detectors phase detecting the $n$ PSK modulated wave with an axis of phase detection of $2\pi(m-1)n$ where $m$ is an integer satisfying the relationship $n \geqq m \geqq 1$, and a control circuit for controlling the passage of an detected output from each of the phase detectors therethrough such that, when the detected output from the $m$th phase detector is under a predetermined threshold level, that phase detector having the axis of phase detection adjacent to that of the $m$th phase detector, has its detected output passed through the control circuit.

DESCRIPTION OF THE DRAWINGS

The present invention will become more apparent from the following detailed description taken in conjunction with the accompanying drawings in which.

DESCRIPTION OF THE PREFERRED EMBODIMENTS

Figure 1:
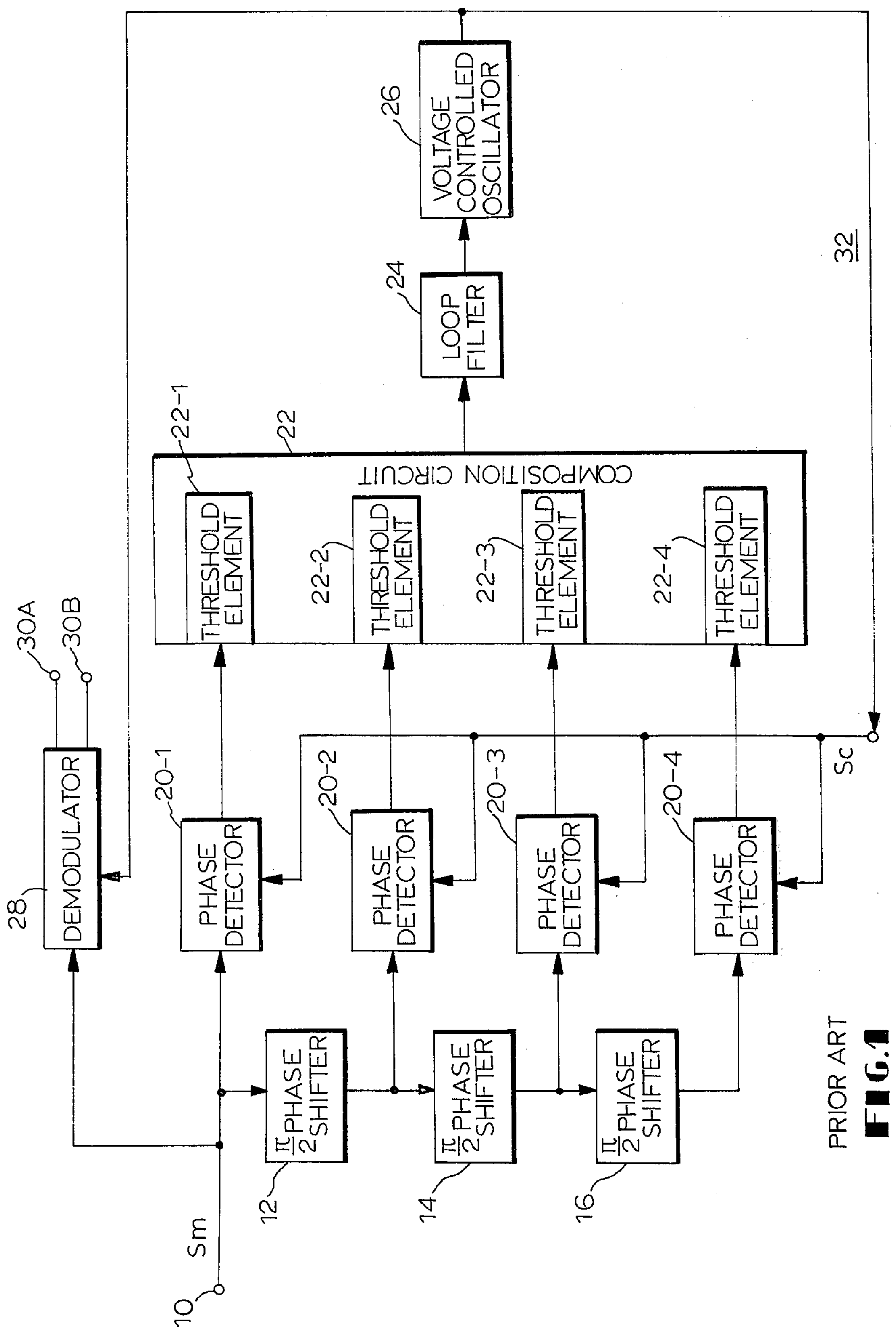
PRIOR ART FIG.1
FIG. 1 is a block diagram of a system for reproducing a carrier wave for a 4 PSK modulated signal in accordance with the principles of the prior art.

Referring now to the drawings and FIG. 1 in particular, there is ilustrated a conventional system for reproducing a carrier wave for a 4 PSK modulated signal. The arrangement illustrated comprises an input terminal 10 to which a 4 PSK modulated signal $Sm$ is applied, and three phase shifters 12, 14 and 16 serially interconnected in the named order with the phase shifter 12 connected to the input terminal 10. The phase shifter 12 phase shifts the 4 PSK modulated signal $Sm$ applied thereto by an angle of $\pi/2$ radians and the phase shifter 14 phase shifts the output from the preceding phase shifter 12 by an angle of $\pi/2$ radians. Similarly, the phase shifter 16 phase shifts the output from the phase shifter 14 by an angle of $\pi/2$ radians.

The input terminal 10 is also connectd to a phase detector 20-1 while the junction of the phase shifters 12 and 14 is connected to a phase detector 20-2 and the junction of the phase shifters 14 and 16 is connected to a phase detector 20-3. The phase shifter 16 is connected to a phase detector 20-4. All the phase detectors 20-1, 20-2, 20-3 and 20-4 have applied thereto a reference signal formed of a carrier signal $Sc$ reproduced in the manner as will be described hereinafter. The phase detector 20-1 directly receives the signal $Sm$ to phase detect it with the reference signal $Sc$. The phase detector 20 receives the output from the phase shifter 12 in $\pi/2$ lagging phase with respect to the signal $Sm$ to phase detect that output with the signal $Sc$. Similarly, the phase shifter 22 receives the output from the phase shifter 14 in $\pi/2$ lagging phase with respect to the output from the phase shifter 12, that is to say, lagging by behind the signal $Sm$ by $\pi$ to phase detect it with the signal $Sc$ and finally the phase shifter 16 receives the output from the phase shifter 16 in $\pi/2$ lagging phase with respect to that from the phase shifter 14, that is to say, lagging behind the signal $Sm$ by $3\pi/2$ to phase detect it with the signal $Sc$. Thus it will be appreciated that the phase detectors 20-1 through 20-4 are operative to phase detect the signal $Sm$ with four axes of phase detection disposed at angular intervals of $\pi/2$.

In general, $n$ phase shifter are used to phase detect an $n$ PSK modulated signal with $n$ axes of phase detection disposed at angular intervals of $2\pi/n$ where $n$ is any integer except for one. Assuming that $m$ is an integer not greater than $n$ and equal to or greater than one, that is to say, $n \geqq m \geqq 1$, an $m$th phase detector is adapted to phase detect the $n$ PSK modulated signal with detection axis of $2\pi(m-1)/n$.

Phase detected signals outputted from the phase detectors 20-1, 20-2, 20-3 and 20-4 are supplied to a composition circuit 22, or respective threshold elements 22-1, 22-2, 22-3 and 22-4 disposed within the composition circuit 22 to set a threshold level. The threshold elements 22-1, 22-2, 22-3 and 22-4 have a predetermined threshold level preset and receive the detected outputs from the phase detectors 20-1, 20-2, 20-3 and 20-4 respectively and permit the detected outputs under the predetermined threshold level to be outputted. As a result, the composition circuit 22 is operative to composite the detected signals under the threshold level together.

The output of the composition circuit 22 is connected to a loop filter 24 and thence to a voltage controlled oscillator 26. The oscillator 26 is then connected to the phase shifters and also to a demodulator 28 having a pair of output terminals 30A and 30B. Thus the composed output from the composition circuit 22 is passed through the loop-filter 24 to the voltage controlled oscillator 26 where a carrier signal *Sc* is reproduced. The carrier signal *Sc* is applied to both the demodulator 28 and the phase detectors 20-1, 20-2, 20-3 and 20-4. The demodulator 28 demodulates the signal *Sc* with the signal S*m* applied thereto through the input terminal 10 to produce digital outputs at the output terminals 30A and 30B. Also the phase detectors 20-1, 20-2, 20-3 and 20-4, the composition circuit 22, the loop filter 24 and the oscillator 26 form a phase locked loop generally designated by the reference numeral 32 through which the reproduced carrier signal *Sc* is fed back to the phase detectors 20-1, 20-2, 20-3 and 20-4.

Figure 2A:
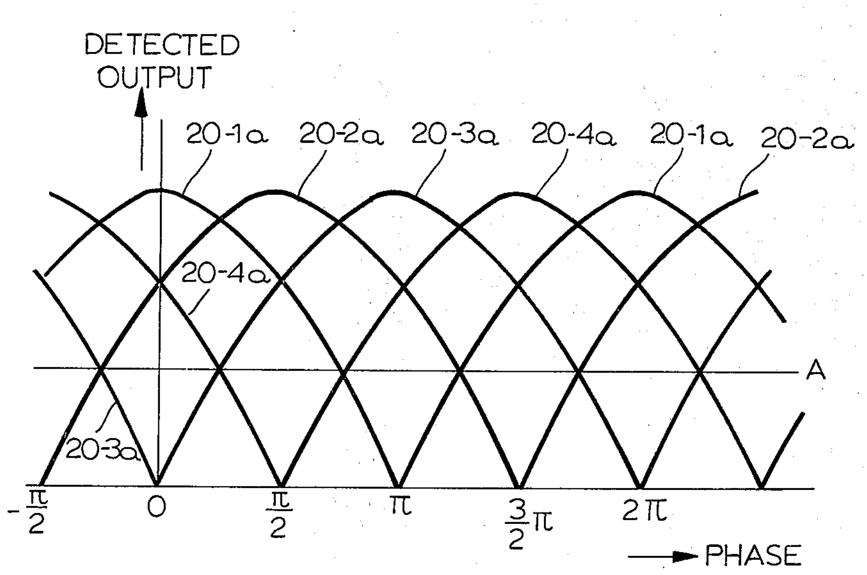
PRIOR ART FIG. 2a
FIGS. 2*a* and 2*b* are graphs illustrating waveforms developed in the arrangement shown in FIG. 1.
Figure 2B:
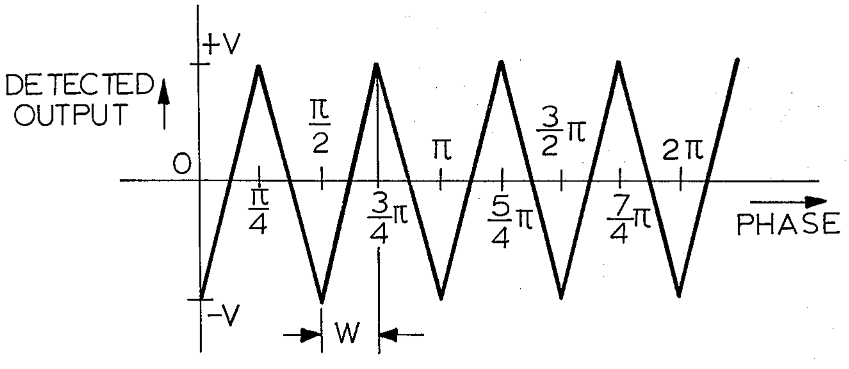
PRIOR ART FIG. 2b

In FIG. 2*a* the detected outputs from the phase detector 20-1, 20-2, 20-3 and 20-4 in the ordinate are plotted against a phase in the abscissa and shown by detection curves 20-1*a*, 20-2*a*, 20-3*a* and 20-4*a* respectively. On the other hand, FIG. 2*b* shows the output from the composition circuit 22. The output is formed of the detected outputs under the threshold level A as shown in FIG. 2*a* composed by the composition circuit 22. The threshold elements 22-1, 22-2, 22-3 and 22-4 (see FIG. 1) are preset to have the level A at which the detected outputs provide a maximum magnitude of $+V_{max}$ and a zero level at which the detected outputs provides a minimum magnitude of $-V$ (see FIG. 2*b*).

As seen in FIG. 2*b*, the output from the composition circuit 22 has the maximum magnitude of $+V_{max}$ at each of $\pi/4$, $3\pi/4$, $5\pi/4$ and $7\pi/4$ radians or at angular intervals of $\pi/2$ and the minimum magnitude of $-V$ at each of phases 0, $\pi/2$, $\pi$ and $3\pi/2$ radians or at angular intervals of $\pi/2$. For an $n$ PSK modulated signal, maximum and minimum magnitudes appear alternately and at angular intervals of $2\pi/n$.

In the arrangement of FIG. 1, the phase locked loop 32 performs the phase locking operation utilizing an angular interval between phases corresponding to each of the maximum magnitude of the detected output and to the next succeeding minimum magnitude thereof or vice versa. That angular interval forms a phase locking area W (see FIG. 2*b*) extending through an angle of $\pi/n$ for an $n$ PSK modulated signal. For example, the locking area extends through an angle of $\pi/4$ for a 4 PSK modulated signal.

Figure 3:
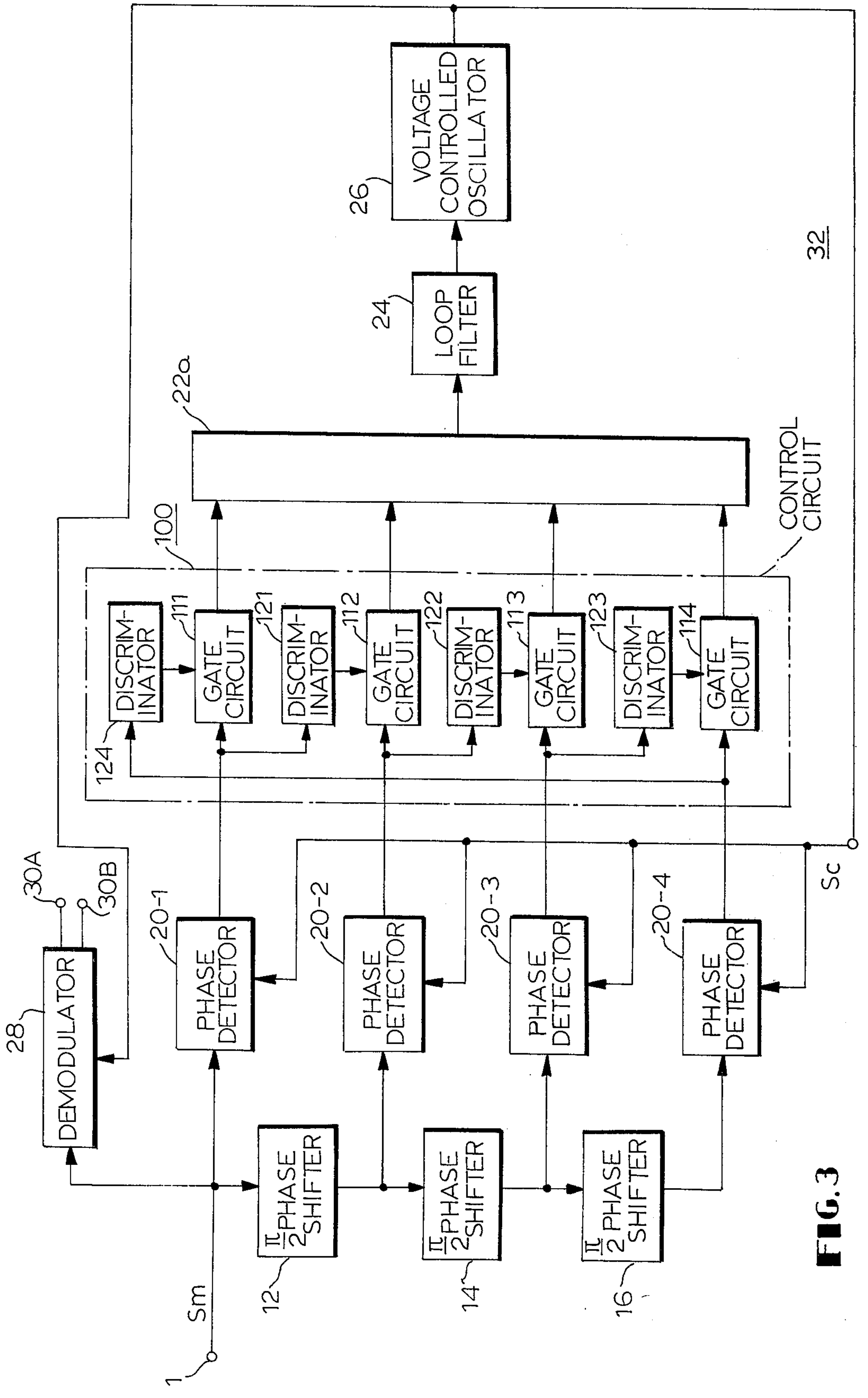
FIG. 3 is a block diagram of a system for reproducing a carrier wave for a 4 PSK modulated signal in accordance with the principles of the present invention.

Referring now to FIG. 3 wherein like reference numerals designate the components similar to those shown in FIG. 1, there is illustrated an embodiment of the present invention applied to a 4 PSK modulated signal. The arrangement illustrated is substantially similar to that shown in FIG. 1 excepting that a control circuit is connected between the phase detectors and the composition circuit from which the threshold elements are omitted. The control circuit generally designated by the reference numeral 100 includes gate circuits 111, 112, 113 and 114 connected at the inputs to different ones of the phase detectors 20-1, 20-2, 20-3 and 20-4 respectively and at the output to the composition circuit 22*a* and level discriminators 121, 122, 123 and 124 connected to the inputs to the associated gate circuits 111, 112, 113 and 114. Each of the discriminators descriminates a level of the detected output from the associated phase detector. That is each discriminator responds to the detected output under a predetermined threshold level from that phase detector connected thereto provide an output for gating the gate circuit connected to that phase detector producing its detected output in $\pi/2$ lagging phase with respect to the detected output supplied to the discriminator. For example, the discriminator 122 responds to the detected output under the threshold level from the phase detector 20-2 to provide an output for driving the gate circuit 113 connected to the phase detector 20-3 that produces the detected output in $\pi/2$ lagging phase with respect to that from the phase detector 20-2.

The detected outputs from the respective phase detectors 20-1, 20-2, 20-3 and 20-4 permitted to pass through the associated gate circuits 111, 112, 113 and 114 are applied to the composition circuit 22*a* where they are composed into a single waveform.

Figure 4A:
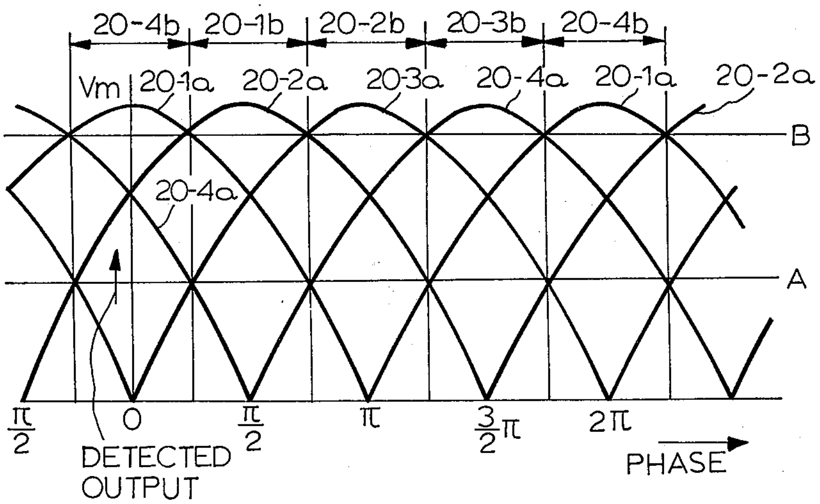
FIGS. 4*a* and 4*b* are graphs illustrating waveforms developed in the arrangement shown in FIG. 3.

FIG. 4*a* shows the detected output from each of the phase detectors in the ordinate plotted against a phase in the abscissa and designated by the same reference numeral as that phase detector suffixed with the reference character "*a*." For example, the phase detector 20-2 produces the detected output 20-2*a*. FIG. 4*a* also shows a plurality of phase areas as defined by vertical lines one for each phase detector. The phase areas are equal in width to one another and designated by the same reference numerals as the corresponding phase detectors suffixed with the reference character "*b*." For example, the phase detector 20-1 corresponds to the phase area 20-1*b*. As long as the detected output from each phase detector is under a predetermined threshold from each phase detector is under a predetermined threshold level as shown at lower horizontal line A in FIG. 4*a*, that portion of the detected output from the phase detector in $\pi/2$ lagging phase with respect to that detected output illustrated in the corresponding phase area is permitted to pass through the associated gate circuit to the composition circuit. For example, that portion of the detected output 20-3*a* from the phase detector 20-3 shown in the phase area 20-3*b* is supplied to the composition circuit 22*a* through the gate circuit 113 because the detected output 20-2*a* behind which the detected output 20-3*a* lags by $\pi/2$ is under the threshold level A. Also in the phase area 20-1*b* the detected output 20-4*a* from the phase detector 20-4 is under the threshold level A so that the detected output 20-1*a* in $\pi/2$ lagging phase with respect to the detected output 20-4*a* is supplied to the composition circuit 22*a* through the gate circuit 111. In other words, those portions of the detected output descending in the corresponding phase areas and defined by threshold levels A and B (see FIG. 4*a*) are supplied through the respective gate circuits to the composition circuit to be composed into a sawtoothed wave such as shown in FIG. 4*b*.

Figure 4B:
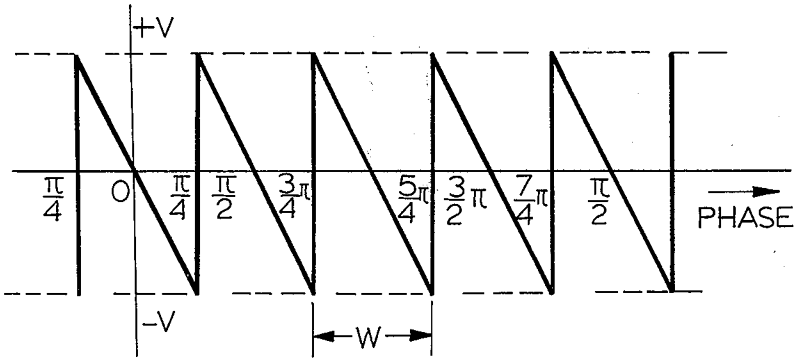

By adjusting the threshold levels A and B, the sawtoothed waveform as shown in FIG. 4*b* has a maximum magnitude of $V_{max}$ corresponding to the upper threshold level B shown in FIG. 4*a* and a minimum magnitude of −V corresponding to the lower threshold level A shown in FIG. 4*a* (see FIG. 4*b*). Each of the detected outputs is varied in approximately linear manner between the threshold levels A and B and accordingly, the sawtoothed waveform is shown in FIG. 4*b* as including slopes in the form of sections of straight line. As shown in FIG. 4*b*, the composed output has both the maximum and minimum magnitudes at equal angular intervals of $\pi/2$ such as at angles of $-\pi/4$, $\pi/4$, $3\pi/4$, $5\pi/4$, $7\pi/4$, . . .

From the foregoing it will be appreciated that the phase locked loop 32 performs the operation of locking phase by utilizing that portion of each of the detected outputs varied from the maximum to the minimum magnitude. Therefore the arrangement of FIG. 3 has a phase locking area of $\pi/2$ which is just equal to twice the locking area obtained by the conventional arrangement shown in FIG. 1.

For an PSK modulated signal where *n* is an integer having a value of two or more, *n* phase detectors are used so that an *m*th phase detector phase detects the *n* PSK modulated signal S*m* lagging by $(m-1)\pi/2$ with the signal Sc where *m* is an integer satisfying the relationship $n \geqq m \geqq 1$. When an *n*th phase detector or the last one provides a detected output under the threshold level A, the phase detector whose number *m* equals one or a first phase detector produces a detected output between the levels A and B, which is, in turn, supplied to the composition circuit 22*a*.

For the other phase detectors whose number *m* does not equal *n*, an $(m+1)$th phase detector produces a detected output between the levels A and B when an detected output from an *m*th phase detector is under the level A. Then the detected output from the $(m+1)$th phase detector is supplied to the composition circuit to be combined with the other detected outputs.

As a result, the output from the composition circuit has simultaneously its maximum and minimum magnitudes with incremental angular intervals of $\pi/n$. Also a phase locking area extends through an angle of $2\pi/n$.

In FIGS. 4*a* the threshold levels A and B have values of 0.38Vm and 0.92Vm where V*m* is a maximum magnitudes of each of the detected outputs 20-1*a*, 20-2*a*, 20-3*a* or 20-4*a*.

Figure 5:
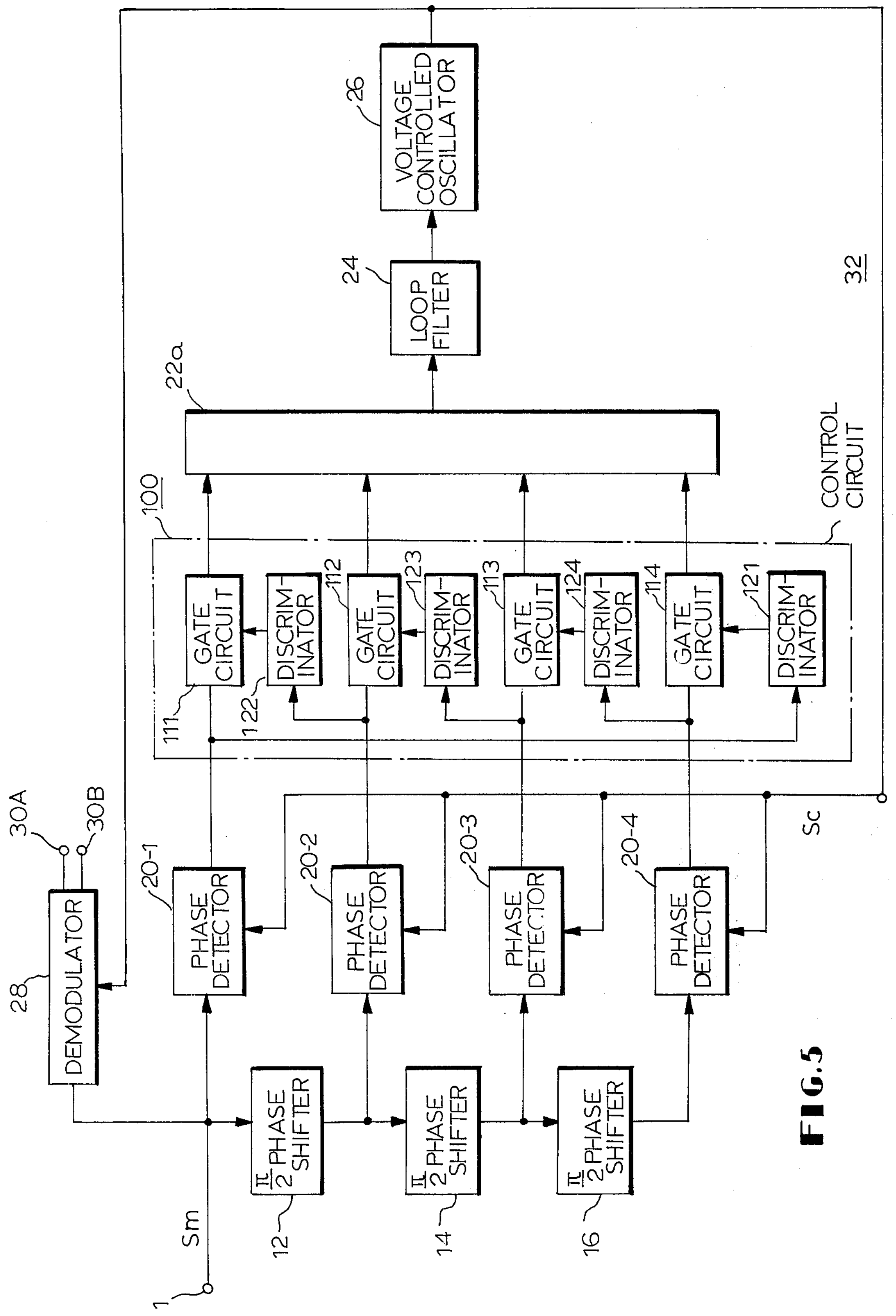
FIG. 5 is a view similar to FIG. 3 but illustrating a modification of the present invention.

In FIG. 5 wherein like reference numerals designate the components identical to those shown in FIG. 3, there is illustrated a modification of the present invention also applied to an *n* PSK modulated signal. The arrangement illustrated is substantially identical to that shown in FIG. 3 except for the connection of each discriminator to the mating gate circuit. More specifically, each of the discriminators is connected at the output to that gate circuit connected to the phase detector producing a detected output in $\pi/2$ leading phase with respect to that from the phase detector connected to the each discriminator. For example, the discriminator 122 coupled to the phase detector 20-2 is connected to the gate circuit 111 connected to the phase detector 20-1 and the discriminator 121 coupled to the phase detector 20-1 is connected to the gate circuit 114 connected to the phase detector 20-4.

Figure 6A:
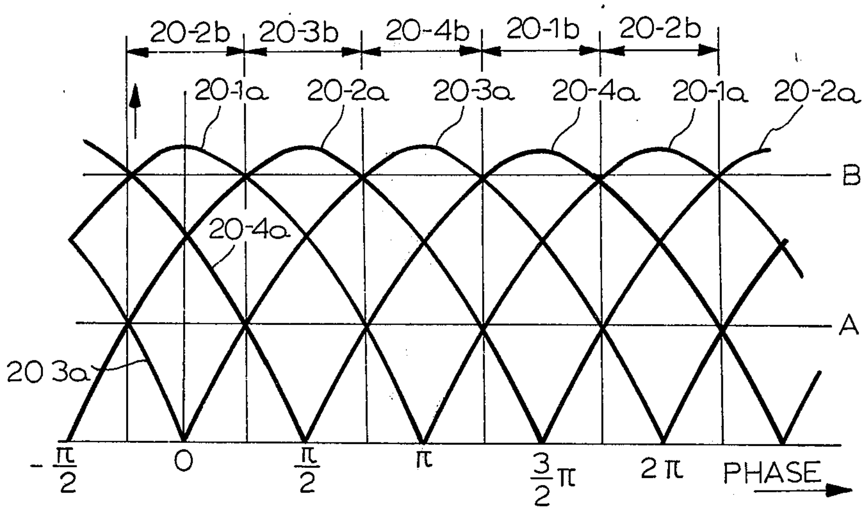
FIGS. 6*a* and 6*b* are graphs illustrating waveforms developed in the arrangement shown in FIG. 5.
Figure 6B:
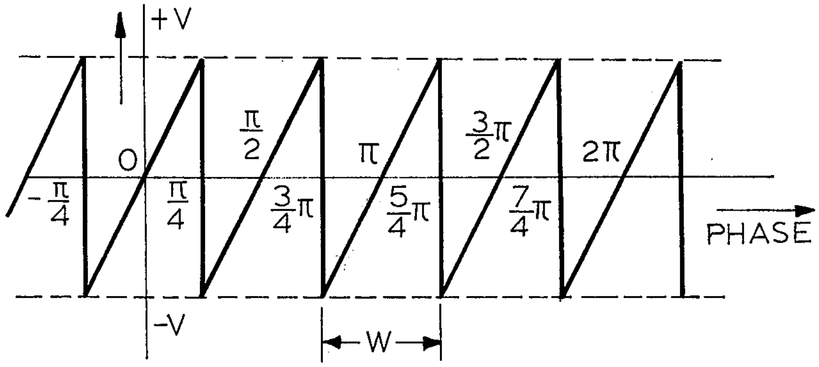

FIGS. 6*a* and 6*b* are views similar to FIGS. 4*a* and 4*b* respectively but illustrating the detected outputs and the composed waveform developed in the arrangement of FIG. 5. In FIG. 6*a* like reference numerals and characters designate the components identical to those shown in FIG. 4*a*. It will readily understood that due to the connection of each discriminator to the mating gate circuit as above described, those portions of the detected outputs from the phase detectors ascending in corresponding phase areas are utilized to be composed into a sawtoothed waveform such as shown in FIG. 6*b*.

For an *n* PSK modulated signal, the phase detector whose number *m* equals *n* or the last one supplies its detected output to the composition circuit as long as the phase detector whose number *m* equals 1 or the first one produces its detected output under the threshold level A. For *m* unequal to 1, an $(m-1)$th phase detector supplied to the composition circuit when an *m*th phase detector produces its detected output under the threshold level A. As in the arrangement of FIG. 3, the phase locking area extends through an angle of $2\pi/n$.

While the present invention has been illustrated and described in conjunction with a few preferred embodiments thereof it is to be understood that numerous changes and modifications may be resorted to without departing from the spirit and scope of the invention.

What we claim is:

1. A system for reproducing a carrier wave for an *n* differential phase shift keyed modulated signal, where *n* is an integer having a value of at least two(2), comprising, in combination, *n* phase detectors for phase detecting said *n* differential phase shift keyed, modulated signal, an $(m+1)$th one of said phase detector detecting said *n* differential phase shift keyed, modulated signal with an axis of phase detection of $2\pi(m-1)\pi/n$ where *m* is an integer satisfying the relationship $n \geqq m \geqq 1$, and a control circuit for controlling the passage of an detected output from each of said phase detectors therethrough so that, when the detected output from the *m*th phase detector is under a predetermined threshold level, that phase detector having the axis of phase detection adjacent to that of the *m*th phase detector has its detected output passed through said control circuit.

2. A system for reproducing a carrier wave as claimed in claim 1, further comprising a composition circuit for composing those portions of the detected outputs from said phase detectors passed through said control circuit, a voltage controlled oscillator electrically coupled to said composition circuit to oscillate in accordance with an output voltage from said composition circuit, and means for feeding an oscillating signal from said voltage controlled oscillator back to each of said phase detectors to form a phase locked loop.

3. A system for reproducing a carrier wave as claimed in claim 1, wherein said control circuit causes the detected output from the $(m+1)$th phase detector, where *m* is not equal to *n* to pass therethrough as long as a detected output from the *m*th phase detector is under the predetermined threshold level and also the detected output from the first phase detector to pass therethrough as long as the detected output from the *n*th phase detector is under the predetermined threshold level.

4. A system for reproducing a carrier wave as claimed in claim 3, wherein said control circuit includes *n* gate circuits for controlling the passage of the detected outputs from said phase detectors respectively and *n* level discriminators for discriminating the levels of the detected outputs from said phase detectors respectively, so that that level discriminator discriminating the level of the detected output from the *m*th phase detector is operative to gate the gate circuit for controlling the passage of the detected output from the *m*th phase detectort, while that level discriminator discriminating the level of the detected output from the *n*th phase detector is operative to drive the gate circuit for controlling the passage of the detected output from the first phase detector therethrough.

5. A system for reproducing a carrier wave as claimed in claim 1, wherein said control circuit causes the detected output from the $(m - 1)$ phase detector to pass therethrough, where $m$ is not equal to one(1), as long as the detected output from the *m*th phase detector is under the predetermined threshold level and also the detected output from the *n*th phase detector to pass therethrough as long as the detected output from the first phase detector is under the predetermined threshold level.

6. A system for reproducing a carrier wave as claimed in claim 5, wherein said control circuit includes *n* gate circuits for controlling the passage of the detected output from said phase detectors respectively and *n* level discriminator for discriminating levels of the detected outputs from said phase detectors respectively so that that level discriminator discriminating the level of the detected output from the *m*th phase detector is operative to drive the gate circuit for controlling the passage of the detected output from the $(m - 1)$th phase detector while that level discriminator discriminating the level of the detected output from the first phase detector is operative to control the gate circuit for controlling the passage of the detected output from the *n*th phase detector.

* * * * *